US005605983A

United States Patent [19]

Dauth et al.

[11] Patent Number: 5,605,983
[45] Date of Patent: Feb. 25, 1997

[54] SOLUBLE ORGANOPOLYSILOXANE FREE-RADICAL MACROINITATORS FOR GRAFT COPOLYMERIZATION

[75] Inventors: Jochen Dauth, Burghausen, Germany; Catherine Oleggini, Oyonnax, France; Bernward Deubzer, Burghausen, Germany

[73] Assignee: Wacker-Chemie GmbH, Munich, Germany

[21] Appl. No.: 360,102

[22] Filed: Dec. 20, 1994

[30] Foreign Application Priority Data

Dec. 23, 1993 [DE] Germany .................. 43 44 309.5

[51] Int. Cl.$^6$ .................. C08G 77/392; C08G 77/388
[52] U.S. Cl. .................. 525/479; 528/10; 528/25; 528/30; 528/38
[58] Field of Search .................. 525/479; 528/25, 528/30, 38

[56] References Cited

U.S. PATENT DOCUMENTS

| | | | |
|---|---|---|---|
| 4,595,740 | 6/1986 | Panster | 528/30 |
| 4,690,986 | 9/1987 | Sasaki et al. | 525/479 |
| 4,826,954 | 5/1989 | Suzuki et al. | 528/15 |
| 5,015,717 | 5/1991 | Martin et al. | 528/30 |
| 5,237,020 | 8/1993 | Clouet | 525/479 |
| 5,250,615 | 10/1993 | Yamamoto | 525/63 |
| 5,385,988 | 1/1995 | Yamamoto | 525/479 |
| 5,391,647 | 2/1995 | Yamamoto | 525/479 |

FOREIGN PATENT DOCUMENTS

| | | |
|---|---|---|
| 0042208 | 12/1985 | European Pat. Off. . |
| 0539901 | 5/1993 | European Pat. Off. . |
| 61-252230 | 11/1986 | Japan . |
| 62-100533 | 5/1987 | Japan . |
| 63-92628 | 4/1988 | Japan . |

OTHER PUBLICATIONS

AN 86–336164 (English Derwent abstract).
AN 87–167570 (English Derwent abstract).
AN 88–151540 (English Derwent abstract).

*Primary Examiner*—Ralph H. Dean

[57] ABSTRACT

The invention relates to partially crosslinked organopolysiloxanes which contain a radical forming group, a base-catalyzed process for their preparation, graft copolymers produced from these organopolysiloxanes and a process for the preparation of the graft copolymers. The present invention avoids problems related to known methods wherein a considerable portion of the organopolymer chains do not graft to the organopolysiloxane graft back-bone but remain as an unattached homopolymers.

7 Claims, No Drawings

SOLUBLE ORGANOPOLYSILOXANE FREE-RADICAL MACROINITATORS FOR GRAFT COPOLYMERIZATION

FIELD OF INVENTION

The present invention relates to partially crosslinked organopolysiloxanes which contain radical-forming groups and are soluble in organic solvents, to a base-catalyzed process for their preparation, to graft copolymers composed of the organopolysiloxanes according to the invention as free-radical macroinitiators and of organic monomers which can be polymerized by a free-radical mechanism, and to a process for the preparation of the graft copolymers.

BACKGROUND OF INVENTION

Processes for the base-catalyzed preparation of organopolysiloxane resins and organopolysiloxane elastomers are already known. For example, EP-B-42 208 describes a process for the preparation of organopolysiloxane resins, involving the metered addition of alkoxysilane and hexamethyldisilazane to a mixture of water and alcohol. The use of different quantities of water and the choice of the ratio of the molar fractions of monofunctional units to tetrafunctional units in this case enables the molecular weight of the resins to be controlled.

One possibility for the preparation of graft copolymers comprises grafting a polymer carrying a reactive, functional end group with reactive monomers. This is called a "grafting onto" process. For example, in EP-A-539 901 vinyl monomers are grafted by emulsion polymerization onto an emulsified organopolysiloxane which contains attachment sites. The attachment sites are produced by dialkoxysilanes which are incorporated into the organopolysiloxane by condensation and contain a radical-forming group. In this "grafting onto" process an external redox initiator system is used to initiate homopolymerization of the organic monomers, the growing organopolymer chains becoming attached in this case to the attachment sites of the organopolysiloxane graft backbone. A disadvantage of this process is that the attachment of the organopolymer to the polysiloxane is not a matter of course, and thus a considerable portion of the organopolymer is not grafted onto the polysiloxane but is present as an unattached homopolymer. A further disadvantage of the "grafting onto" process is that, as a result of intramolecular linkages, especially the formation of loops by multiple attachment of the organopolymer chain to the organosilicon polymer core, graft copolymers of uncontrolled composition are formed, a fact which can be demonstrated by structural characterization of such graft copolymers, for example using static and dynamic light scattering.

The object was to provide organopolysiloxane resins and organopolysiloxane elastomers which have radical-forming groups, can be prepared with simplicity and a high degree of reproducibility, and can be used to synthesize, by free-radical polymerization, graft copolymers which do not have the above mentioned disadvantages of the known graft copolymers, namely a high proportion of organopolymer homopolymer and an uncontrolled composition.

SUMMARY OF INVENTION

The present invention relates to partially crosslinked organopolysiloxanes which contain radical-forming groups and are composed of from 0.2% to 50.0% by weight of units of the formula $$[R_aSi(O_{(3-a)/2})-R^1-X-R^1-Si(O_{(3-a)/2})R_a] \quad (1),$$

from 0% to 80.0% by weight of units of the formula $$[R^2{}_3SiO_{1/2}] \quad (2)$$

from 0% to 99.3% by weight of units of the formula $$[R^2{}_2SiO_{2/2}] \quad (3)$$

from 0% to 99.8% by weight of units of the formula $$[R^2SiO_{3/2}] \quad (4)$$

and from 0% to 80.0 by weight of units of the formula $$[SiO_{4/2}] \quad (5)$$

where
  R radicals denote identical or different monovalent SiC-bonded, optionally substituted $C_1$ to $C_{18}$-hydrocarbon radicals,
  $R^1$ radicals denote identical or different divalent SiC-bonded, optionally substituted $C_1$ to $C_{18}$-hydrocarbon radicals which may be interrupted by divalent radicals, attached on both sides to carbon atoms, from the group consisting of —O—, —COO—, —OOC—, —CONR²—, —NR²CO—, —NR²— and —CO—,
  $R^2$ denotes a hydrogen atom or a radical R,
  X denotes a radical from the group consisting of —N=N—, —O—O—, —S—S— and —C(C₆H₅)₂—C(C₆H₅)₂—, and
  a denotes the value 0, 1 or 2,
with the proviso that the sum of the units of formulae (4) and (5) is at least 0.5% by weight and that at least 15 g of the organopolysiloxanes are soluble in 100 ml of toluene at 20° C.

Examples of unsubstituted radicals R are alkyl radicals such as the methyl, ethyl, n-propyl, isopropyl, n-butyl, isobutyl, tert-butyl, n-pentyl, isopentyl, neopentyl and tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; alkenyl radicals such as the vinyl, allyl, n-5-hexenyl, 4-vinylcyclohexyl and the 3-norbornenyl radical; cycloalkyl radicals such as cyclopentyl, cyclohexyl, 4-ethylcyclohexyl and cycloheptyl radicals, norbornyl radicals and methylcyclohexyl radicals; aryl radicals such as the phenyl, biphenylyl, naphthyl, anthryl and phenanthryl radical; alkaryl radicals such as o-, m- and p-tolyl radicals, xylyl radicals and ethylphenyl radicals; and aralkyl radicals such as the benzyl radical and the α-, β-phenylethyl radical.

Examples of substituted hydrocarbon radicals R are halogenated hydrocarbon radicals, such as the chloromethyl, 3-chloropropyl, 3-bromopropyl, 3,3,3-trifluoropropyl and 5,5,5,4,4,3,3-heptafluoropentyl radical and the chlorophenyl, dichlorophenyl and trifluorotolyl radical; mercaptoalkyl radicals such as the 2-mercaptoethyl and 3-mercaptopropyl radical; cyanoalkyl radicals such as the 2-cyanoethyl and the 3-cyanopropyl radical; aminoalkyl radicals such as the 3-aminopropyl, N-(2-aminoethyl)-3-aminopropyl and the N-(2-aminoethyl)-3-amino(2-methyl)propyl radical; aminoaryl radicals such as the aminophenyl radical; acyloxyalkyl radicals such as the 3-acryloyloxypropyl and 3-methacryloyloxypropyl radical; and hydroxyalkyl radicals such as the hydroxypropyl radical, and radicals of the formulae

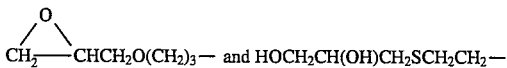

The radical R is preferably the methyl, ethyl, n-propyl, vinyl, 3-norbornenyl, n-5-hexenyl, tolyl and phenyl radical, especially the methyl and the vinyl radical.

Examples of substituents on the divalent hydrocarbon radicals $R^1$ are halogen atoms and $C_1$-$C_6$-alkoxy radicals. Examples of divalent hydrocarbon radicals $R^1$ are saturated, branched or unbranched alkylene radicals such as the methylene and ethylene radical, and also propylene, butylene, pentylene, 1-methylpentylene, hexylene, cyclohexylene and octadecylene radicals or unsaturated alkylene or arylene radicals, such as the hexenylene radical, phenylene radicals such as the 2-chloro-1,4-phenylene radical and, in particular, radicals of the formulae $$—(CH_2)_3N(R^3)—C(O)—(CH_2)_2—C(CN)(CH_3)— \quad (6)$$

and, $$—(CH_2)_3—O—C(O)—(CH_2)_2—C(O)— \quad (7)$$

in which $R^3$ denotes a hydrogen atom or identical or different monovalent SiC-bonded, optionally substituted $C_1$- to $C_6$-hydrocarbon radicals, Preferred radicals X are —N=N— and —O—O—.
Preferred units of formula (1) come under the formula $$[(CH_3)_aSi(O_{(3-a)/2})—(CH_2)_3—N(R^3)—C(O)—(CH_2)_2—C(CN)(CH_3)—N=]_2 \quad (1a)$$

in which a and $R^3$ are as defined above.

The organopolysiloxanes according to the invention preferably contain from 0.5% to 20.0% by weight, in particular from 1.0% to 10.0% by weight, of units of formula (1).

The organopolysiloxanes according to the invention are preferably organopolysiloxane resins or organopolysiloxane elastomers which preferably include as some of the radicals $R^2$ hydrogen atoms, methyl, vinyl or epoxide radicals.

Preferably at least 30 g of the organopolysiloxanes according to the invention are soluble in 100 ml of toluene at 20° C. The organopolysiloxanes according to the invention are also highly soluble in other organic solvents such as dioxane and tetrahydrofuran (THF) and are therefore suited for employment as free-radical macroinitiators for graft polymerization in solution. The average molar masses of the organopolysiloxanes according to the invention are preferably from $10^3$ to $10^5$ g/mole, in particular from $5·10^3$ to $5·10^4$ g/mole.

The partially crosslinked organopolysiloxanes according to the invention, containing radical-forming groups, are preferably prepared by reacting a mixture of the components
(A) organosilanes of the formula $$R_aSi(OR^4)_{3-a}—R^1—X—R^1—Si(OR^4)_{3-a}R_a \quad (8),$$

(B) organosilicon compounds selected from
(B1) organosilanes of the formula $$R^2_bSi(OR^4)_{4-b} \quad (9)$$

and
(B2) organosiloxanes comprising units of the formula $$R^2_c(OR^4)_dSiO_{(4-c-d)/2}, \quad (10),$$

(C) at least 0.5 mole of water per mole of alkoxy groups in components A and B and,
(D) optionally a water-miscible solvent,
(E) in the presence of ammonia or primary or secondary $C_1$-$C_4$-alkylamine or of a compound which, with water, liberates ammonia or primary or secondary $C_1$-$C_4$-alkylamine,
where, in formulae (8) to (10), $R^4$ is as defined for $R^2$, b, c and d each denote the values 0, 1, 2 or 3, and R, $R^1$, $R^2$, X and a are as defined above, with the proviso that component B contains at least 0.01 mole of alkoxy groups per mole of silicon atoms.

The organopolysiloxanes prepared by the process according to the invention have a more uniform molecular weight than organopolysiloxanes prepared using acidic catalysts. Moreover, acidic catalysts bring about a dissociation of the initiator groups of the formulae (1) and (8).

Examples of radical $R^4$ are the examples given for R. The radical $R^4$ is preferably an alkyl group having 1 to 6 carbon atoms and possibly substituted, preferably by $C_1$-$C_6$-alkyloxy groups or hydroxyl groups.

The radical $R^4$ is preferably the methyl, ethyl, n-propyl, isopropyl or hexyl radical, especially the methyl or ethyl radical.

Examples of organosilanes B1 of formula (9) which can be employed in the process according to the invention are tetramethoxysilane, tetraethoxysilane, tetra-n-propoxysilane, methyltrimethoxysilane, vinyltrimethoxysilane, 3-mercaptopropyltrimethoxysilane, 3-chloropropyltrimethoxysilane, phenyltrimethoxysilane, o-, m- and p-tolyltrimethoxysilane, propyltrimethoxysilane, methyltriethoxysilane, vinyltriethoxysilane, vinyldimethylethoxysilane, 3-mercaptopropyltriethoxysilane, propyltrimethoxysilane, dimethyldiethoxysilane, dimethyldimethoxysilane and trimethylethoxysilane, with tetraethoxysilane, methyltrimethoxysilane, dimethyldiethoxysilane, vinyldimethylethoxysilane, methyltriethoxysilane, phenyltriethoxysilane, o-, m- and p-tolyltriethoxysilane and propyltriethoxysilane being preferred and tetraethoxysilane being more preferred.

Examples of hydrogen-containing organosilanes of formula (9) which can be employed in the process are trihydridoethoxysilane, dihydridomethylethoxysilane, hydridodimethylethoxysilane, hydridomethyldiethoxysilane and hydridophenyldiethoxysilane.

The organosiloxanes B2 which can be employed in the process according to the invention preferably have not more than 15 units of formula (10). Examples of organosiloxanes B2 are linear organosiloxanes such as disiloxanes, for example hexamethyldisiloxane, 1,3-diphenyltetramethyldisiloxane, 1,3-bis(n-5-hexenyl)tetramethyldisiloxane, and 1,3-divinyltetramethyldisiloxane, preferably hexamethyldisiloxane and 1,3-divinyltetramethyldisiloxane and cyclic organopolysiloxanes comprising from 3 to 8, preferably 4 or 5, units of formula (10), such as hexamethylcyclotrisiloxane, octamethylcyclotetrasiloxane and decamethylcyclopentasiloxane.

Examples of hydrogen-containing organosiloxanes B2 which can be employed in the process are dihydridotetramethyldisiloxane, tetrahydridodimethyldisiloxane, dihydridotetraphenyldisiloxane, trihydridotrimethylcyclotrisiloxane, tetrahydridotetramethylcyclotetrasiloxane and pentahydridopentamethylcyclopentasiloxane.

Component B may also contain monomeric and polymeric silicates. This is especially the case for the preparation of resins. Preferred silicates are methyl orthosilicate, ethyl orthosilicate, methyl polysilicate and ethyl polysilicate, the silicates containing alkoxy radicals.

The content of alkoxy groups in component B is preferably 0.5–2 mole, in particular 0.65 to 1.5 mole, per mole of silicon atoms.

As component C it is preferred to employ at least 0.5 mole, in particular from 0.5 to 0.8 mole, of water per mole of alkoxy groups in components A and B. A high proportion of water per mole of alkoxy groups in components A and B brings about an increase in the gel fractions.

As component D it is preferred to employ organic solvents which, at a volume ratio of 1:1, form a homogeneous mixture with water at 20° C. Examples of solvents which are suitable as component D are monohydric and polyhydric alcohols such as methanol, ethanol, n-propanol, isopropanol and ethylene glycol; ethers such as dioxane and tetrahydrofuran; amides such as dimethylformamide; dimethyl sulfoxide and sulfolane, or mixtures of these solvents.

More preferred solvents are those having a boiling point or boiling range of up to 120° C. at 0.1 MPa, especially the monohydric alcohols above.

Component D is preferably added in a quantity depending on the particular system, the gel fraction is equal to 0, said quantity being preferably from 20% to 300% by weight and in particular from 50% to 100% by weight based on the proportion of silane in component B.

As compounds of component E which, with water, liberate ammonia or primary or secondary $C_{1-C_4}$-alkylamine it is preferred to employ the compounds of formulae $$R^5{}_n SiZ_{4-n} \quad (11),$$

$$(R^5{}_3Si)_2NH \quad (12),$$

$$(R^5{}_2SiNH)_x \quad (13),$$

$$(R^5{}_3Si)_2NR^6 \quad (14)$$

and $$(R^5{}_2SiNR^6)_y \quad (15),$$

where $R^5$ denotes a hydrogen atom, a C1-C4-alkyl radical or the vinyl radical, $R^6$ denotes a $C_1$–$C_4$-alkyl radical, denotes the group -$NHR^6$ or $NR^6{}_2$, n denotes the values 2 or 3, x denotes integers from 3 to 6, and y denotes integers from 1 to 12.

It is more preferred to employ ammonia or compounds of formula (12), especially hexamethyldisilazane and divinyltetramethyldisilazane.

Ammonia or primary or secondary $C_1$–$C_4$-alkylamine in the process is active as catalyst and is preferably removed after the reaction, in particular by treatment under reduced pressure.

In the process it is preferred to employ 0.005–0.5 mole, in particular 0.05–0.3 mole, of ammonia or primary or secondary $C_1$–$C_4$ -alkylamine or of compounds which, with water, liberate the above quantities of ammonia or primary $C_1$–$C_4$-alkylamine, per mole of component B.

Using the process according to the invention it is possible to prepare organopolysiloxane elastomers and organopolysiloxane resins by choosing the components B and E employed. Silanes of formula (9) in which (4-b)=w and siloxanes of formula (10) in which (4-c-d)=w lead, in the partially crosslinked organopolysiloxanes which contain radical-forming groups, to units of formulae (2), (3), (4) and/or (5) and are called, respectively, M, D, T and Q units for w=1, 2, 3 and 4 respectively. The process is particularly suitable for the preparation of elastomers and silicone resins, in particular of M/Q resins in which the M/Q ratio is preferably from 0.4:1 to 1.5:1, in particular from 0.5:1 to 1:1. It is possible for example to prepare transparent, monomodally distributed MQ resins which are soluble in organic solvents and whose molecular weights can be adjusted, preferably, from 4000 g/mole to 25,000 g/mole. When prepared, such MQ resins have a gel fraction of less than 2% by weight, based on the theoretical yield.

The process is preferably carried out at from –20° C. to 50° C., in particular from 0° C. to 40° C. Preferably, all volatile components such as water and solvents, such as ethanol, are removed after the reaction preferably under reduced pressure.

In the process, it is preferred to take components A, B and E as an initial charge and to meter in C and D. It is preferred to work with the exclusion of light.

Following the reaction of components A to E, the organopolysiloxanes obtained, in particular the resins, can be post-condensed by an acidic or basic procedure in order to reduce the content of—$OR^4$ groups, in particular the content of alkoxy groups. This can be carried out using even strong bases, such as alkali metal hydroxides and alkaline earth metal hydroxides, as condensation catalysts in organic solvents, preferably toluene. Post-condensation to reduce the content of alkoxy groups is also possible in the case of hydrogen-containing organopolysiloxanes if carried out under anhydrous conditions.

The organopolysiloxanes are preferably employed as free-radical macroinitiators for the graft copolymerization of ethylenically unsaturated organic monomers.

The invention also relates to a process for the preparation of graft copolymers, in which from 95% to 5% by weight of organopolysiloxanes are reacted with from 5% to 95% by weight of ethylenically unsaturated monomers.

In the process according to the invention the polymer to be grafted carried a reactive group which reacts with the monomer added for grafting. This process is called a "grafting from" process. When polymerization is initiated the graft branches grow directly onto the graft backbone, so that graft copolymers of defined structure can be built up in a targeted and controllable manner. By the symmetrical, covalent incorporation of initiators of formula (8) into the polymer to be grafted, which initiators are able to dissociate to form free radicals and can then initiate graft copolymerization reactions, homopolymerization of the graft monomer is possible only to a very small degree and only by transfer reactions.

The process for the preparation of graft copolymers can be carried out in bulk or in the presence of organic solvents, it being possible for the organopolysiloxanes to be partially or completely dissolved. Solvents employed are preferably ethers, such as tetrahydrofuran and dioxane, or hydrocarbons, such as toluene. Organic solvents are preferably employed in from 0 to 10 times the quantity by weight, in particular from 1 to 3 times the quantity of the organopolysiloxanes.

If desired the organopolysiloxanes can be taken as an initial charge together with solvent. However, it is also possible for all the components of the process to be mixed before the free-radical macroinitiator is activated.

The reaction preferably takes place with the exclusion of moisture and oxygen. The reaction mixture is preferably saturated with nitrogen for from 10 to 90 minutes, and the pH should preferably be 7 to 9 before the free-radical macroinitiator is activated. It is preferred to meter in ethylenically unsaturated organic monomers in a quantity of 20% to 80% by weight, based on the total weight of the graft copolymer. Monomers which are preferably employed for the organic polymer components are acrylic acid, methacrylic acid, acrylates or methacrylates of aliphatic alcohols and diols having 1 to 10 carbon atoms, acrylonitrile, styrene, p-methylstyrene, vinyl acetate, vinyl propionate, maleimide, vinylpyrrolidone, vinyl chloride, ethylene, butadiene, isoprene and chloroprene. Particular preference is given to styrene and to acrylates and methacrylates of aliphatic alcohols having 1 to 4 carbon atoms, for example methyl (meth)acrylate, ethyl (meth)acrylate or butyl (meth)acrylate and ethylene glycol di(meth)acrylate. Both homopolymers and copolymers of the above mentioned monomers are suitable as the organic polymer component. Graft polymerization with monomers containing two ethylenic double bonds leads to cross-linked graft polymers.

The grafting onto the organopolysiloxane free-radical macro-initiators is preferably started by increasing the temperature to 50° C. to 110° C., preferably 80° C. to 95° C. For complete polymerization the initial temperature is maintained from 30 minutes to 8 hours, preferably 1 to 2 hours. Residual quantities of un-reacted organic monomer can subsequently be removed by distillation, if desired, and preferably, together with the solvent.

The invention further relates to the graft copolymers which are obtainable by the process according to the invention.

Graft copolymers whose organopolysiloxane components contain vinyl groups and silicon-bonded hydrogen can subsequently be crosslinked using platinum catalysts in the course of hydrosilylation.

The molar masses of the graft copolymers are preferably from $10^4$ to $10^7$ g/mole, in particular from $5 \cdot 10^4$ to $5 \cdot 10^5$ g/mole.

The graft copolymers prepared by the process exhibit a defined composition by targeted attachment of the organopolymer chains to the silicon graft backbone and (silicone) core/(organopolymer) shell structure. Depending on the content of units of formula (1) and therefore on the density of grafting sites on the organopolysiloxane, the graft copolymer structures which develop have a star to brush form. Graft copolymers which have been prepared by grafting onto a soft, less crosslinked silicone elastomer core also have an increased proportion of organopolymer chains in the interior of the silicone elastomer core and display the properties of interpenetrating networks. The graft copolymers dissolve well in organic solvents, in particular in the solvents suitable for graft polymerization, and can be processed as thermoplastics. In addition, the graft copolymers prepared by the process exhibit markedly improved attachment of the organopolymer to the silicone graft backbone and therefore have a considerably lower proportion of free organopolymer homopolymer than corresponding graft copolymers prepared in accordance with the prior art by the "grafting onto" method.

The graft copolymers according to the invention are particularly suitable for application as modified thermoplastics or for use as additives for polymer modification.

In the examples which follow, unless stated otherwise, (a) all indications of quantity are by weight;

(b) all pressures are 0.10 MPa (absolute); and (c) all temperatures are 20° C.

The following abbreviation has been used: p.a.=for analysis. Examples—Organopolysiloxane free-radical macroinitiators

EXAMPLE 1

7.5 g (23.6 mmol) of 4,4,'-azobis(4-cyanopentanoyl chloride) were dissolved in 20 ml of dichloromethane and the solution was filtered. The solution was added dropwise slowly at −10° C. to a mixture of 11.67 g (47.2 mmol) of methylaminopropyltriethoxysilane and 5.26 g (52 mmol) of triethylamine in 500 ml of anhydrous diethyl ether and the mixture was allowed to react for a further hour at −10° C. The white precipitate formed was filtered off and the clear filtrate, containing the product, was concentrated to constant weight at 25° C. under a high vacuum. 15 g (89% of theory) of pale yellow, crystalline product were obtained (azo I).

EXAMPLE 2

The procedure of Example 1 was repeated but using, instead of 11.67 g (47.2 mmol) of methylaminopropyltriethoxysilane, 14.40 g (47.2 mmol) of cyclohexylaminopropyltriethoxysilane. 16 g (97% of theory) of a yellow, liquid product were obtained (azo II).

EXAMPLE 3

10.45 g (50 mmol) of tetraethoxysilane, 1.61 g (10 mmol) of hexamethyldisilazane and 0.6 g (0.84 mmol) of azo I were placed in a reaction vessel at room temperature with the exclusion of light. Subsequently a mixture of 8 g (174 mmol) of ethanol (p.a.) and 1.8 g (100 mmol) of water was added dropwise rapidly. The reaction mixture was stirred in the closed reaction vessel for 4 hours at room temperature, then the reaction vessel was opened and stirring was continued for 20 hours under an air atmosphere at room temperature. The crude product was filtered and the clear solution was concentrated to constant weight at 38° C under a high vacuum. 4.81 g (95.6% of theory) of transparent, solid product were obtained (MQ I).

EXAMPLE 4

The procedure of Example 3 was repeated but using, instead of 1.61 g (10 mmol) of hexamethyldisilazane, 2.83 g (17.5 mmol) of hexamethyldisilazane and, instead of 0.6 g (0.84 mmol) of azo I, 0.66 g (0.92 mmol) of azo I. 6.2 g (98% of theory) of transparent, liquid product were obtained (MQ II).

EXAMPLE 5

The procedure of Example 3 was repeated but using, instead of 1.61 g (10 mmol) of hexamethyldisilazane, 2.02 g (12.5 mmol) of hexamethyldisilazane and, instead of 0.6 g (0.84 mmol) of azo I, 0.62 g (0.87 mmol) of azo I. 5.4 g (99% of theory) of transparent, solid product were obtained (MQ III).

EXAMPLE 6

(basic post condensation)

38 g of MQ III from Example 5 were dissolved in 150 ml of toluene with the exclusion of light, and 937 μl (500 ppm) of a 23% strength solution of potassium hydroxide in methanol were added. The reaction solution was stirred at room temperature for 48 hours. Then 4 g of an acidic neutralizing agent were added and the mixture was stirred at room temperature for a further 30 minutes. After filtration the clear filtrate was concentrated to constant weight at 38° C under a high vacuum. 34 g (89.5% of theory) of transparent powder were obtained (MQ III K).

EXAMPLE 7

52.08 g (250 mmol) of tetraethoxysilane, 10.09 g (62.5 mmol) of hexamethyldisilazane, 1.86 g of azo I (2.6 mmol), 5.79 g (31.25 mmol) of divinyltetramethyldisilazane and 4.2 g of dihydridotetramethyldisiloxane (31.25 mmol) were placed in a reaction vessel at room temperature with the exclusion of light. Then a mixture of 40 g (870 mmol) of ethanol p.a. and 9 g (500 mmol) of water was added dropwise rapidly. The reaction mixture was stirred in the closed reaction vessel at room temperature for 4 hours, then the reaction vessel was opened and stirring was continued at room temperature under an air atmosphere for 20 hours. The crude product was filtered and the clear solution was concentrated to constant weight at 40° C. under a high vacuum. 31.42 g (94% of theory) of transparent, liquid product were obtained (MQ IV).

EXAMPLE 8

(acidic post-condensation)

31.0 g of MQ IV from Example 7 were dissolved in 130 ml of toluene, and 364.5 µl (500 ppm) of 37% strength aqueous hydrochloric acid were added. The reaction solution was stirred at room temperature with the exclusion of light for 72 hours and then neutralized with 1.5 g (37 mmol) of magnesium oxide. After filtration the clear filtrate was concentrated to constant weight at 38° C under a high vacuum. 17.23 g (55.5% of theory) of transparent, viscous product were obtained (MQ IV K).

EXAMPLE 9

The procedure of Example 3 was repeated but using, instead of 1.61 g (10 mmol) of hexamethyldisilazane, 14.1 g (87.5 mmol) of hexamethyldisilazane, instead of 10.45 g (50 mmol) of tetraethoxysilane, 73.15 g (350 mmol) of tetraethoxysilane and, instead of 0.6 g (0.84 mmol) of azo I, 2.62 g (3.7 mmol) of azo I. Instead of 8 g (174 mmol) of ethanol, 56 g (1222 mmol) of ethanol were added and, instead of 1.8 g (100 mmol) of water, 12.6 g (700 mmol) of water were added. 38 g (99% of theory) of transparent, solid product were obtained (MQ V). MQ V was subjected to post-condensation analogously to Example 6. 34.5 g (91% of theory) of solid transparent powder were obtained (MQ V K).

EXAMPLE 10

6.24 g (30 mmol) of tetraethoxysilane, 17.76 g (120 mmol) of dimethyldiethoxysilane, 6.06 g (37.5 mmol) of hexamethyldisilazane and 0,902 g (1.3 mmol) of azo I were placed in a reaction vessel at room temperature with the exclusion of light. Subsequently a mixture of 24 g (588 mmol) of ethanol and 5.4 g (300 mmol) of water was added dropwise rapidly. The reaction mixture was stirred in the closed reaction vessel at room temperature for 24 hours. The crude product was filtered and the clear solution was concentrated to constant weight at 38° C under a high vacuum. 6.3 g (36% of theory) of a yellow liquid product were obtained (MQ VI) which was subjected to post-condensation analogously to Example 6. 5 g (79% of theory) of liquid product were obtained (MQ VI K).

EXAMPLES

Graft copolymers

EXAMPLE 11

A 100 ml Schlenk flask was heated three times and evacuated and then flushed with nitrogen. Under inert gas 3.5 g (35 mmol) of destabilized methyl methacrylate and 1.5 g of MQ VI K from Example 10 were placed in the flask. After addition of 10 g of toluene as solvent the solution was frozen in liquid nitrogen, evacuated under a high vacuum and slowly thawed again. After the reaction mixture had become liquid, the flask was flushed with nitrogen. The steps described for degassing the system were repeated a total of three times.

The solution was then polymerized under protective gas and with stirring at 90° C. for 24 hours, becoming highly viscous. After the reaction time the mixture was diluted with toluene and slowly precipitated in 100 ml of methanol with stirring. The voluminous white precipitate was filtered off with suction, re-dissolved in toluene and precipitated in 100 ml of methanol. The graft copolymer was filtered off and dried under a high vacuum. 2.33 g (47% of theory) of white powder were obtained.

EXAMPLE 12

The procedure of Example 11 was repeated but using, instead of 1.5 g of MQ VI K, 6 g of MQ IV K from Example 8, 2.6 g (30 mmol) of methyl methacrylate instead of 3.5 g and 15 g of toluene instead of 10 g of toluene. 3 g (35% of theory) of a white powder were obtained (P 1).

EXAMPLE 13

The procedure of Example 11 was repeated but using, instead of 1.5 g of MQ VI K, 1.5 g of MQ V K from Example 9, using 3.5 g (17.7 mmol) of destabilized ethylene glycol dimethacrylate instead of 3.5 g of methyl methacrylate, and using 20 g of toluene instead of 10 g of toluene. 25 g (100% of theory) of a stiff, transparent, insoluble gel were obtained.

EXAMPLE 14

The procedure of Example 11 was repeated but using, instead of 1.5 g of MQ VI K, 1.0 g of MQ V K from Example 9, using 9 g (87 mmol) of destabilized styrene instead of 3.5 g of methyl methacrylate and using 20 g of toluene instead of 10 g of toluene. 2.45 g (25% of theory) of a white powder were obtained.

EXAMPLE 15

The procedure of Example 14 was repeated but using, instead of 1.0 g of MQ V K, 5 g of MQ V K and using 5 g of styrene instead of 9 g of styrene. 5.0 g (50% of theory) of a white powder were obtained.

EXAMPLE 16

The procedure of Example 11 was repeated but using, instead of 1.5 g of MQ VI K, 3 g of MQ III K from Example 6, 7 g (81 mmol) of destabilized vinyl acetate instead of 3.5 g of methyl methacrylate and 20 g of toluene instead of 10 g of toluene. 2.5 g (25% of theory) of a yellow solid were obtained.

EXAMPLE 17

The procedure of Example 11 was repeated but using, instead of 1.5 g of MQ VI K, 1.5 g of MQ V K from Example 9. 3.2 g (64% of theory) of a white powder were obtained.

EXAMPLE 18

The procedure of Example 11 was repeated but using, instead of 1.5 g of MQ VI K, 5 g of MQ V K from Example 9, using 5 g (39 mmol) of destabilized n-butyl acrylate instead of 3.5 g of methyl methacrylate and using 20 g of toluene instead of 10 g of toluene. 4.87 g (49% of theory) of a tacky, transparent solid were obtained.

EXAMPLE 19

(crosslinking)

2 g of P 1 from Example 12 were dissolved in 10 g of toluene, and 100 ppm (based on pure platinum) of a platinum catalyst consisting of hexachloroplatinic acid and divinyltetramethyldisiloxane were added. After 2 hours an insoluble, pale yellow transparent gel was obtained.

What is claimed is:

1. A partially crosslinked organopolysiloxane containing radical-forming groups, composed of from 0.2 to 50.0% by weight of units of the formula $$[R_aSi(O_{(3-a)/2})-R^1-X-R^1-Si(O_{(3-a)/2})R_a] \quad (1),$$

from 0% to 80.0% by weight of units of the formula $$[R^2{}_3SiO_{1/2}] \quad (2),$$

from 0% to 99.3% by weight of units of the formula $$[R^2{}_2SiO_{2/2}] \quad (3),$$

from 0% to 99.8% by weight of units of the formula $$[R^2SiO_{3/2}] \quad (4),$$

and from 0% to 80.0 by weight of units of the formula $$[SiO_{4/2}] \quad (5),$$

where
- R radicals denote identical or different monovalent SiC-bonded, optionally substituted $C_1-C_{18}$-hydrocarbon radicals,
- $R^1$ radicals denote identical or different divalent SiC-bonded, optionally substituted $C_1-C_{18}$-hydrocarbon radicals which may be interrupted by divalent radicals, attached on both sides to carbon atoms, from the group consisting of —O—, —COO—, —OOC—, —CONR²—, —NR²CO—, —NR²— and —CO—,
- $R^2$ denotes a hydrogen atom or a radical R,
- X denotes a radical from the group consisting of —N=N—, —O—O—, —S—S— and —C(C₆H₅)₂—C(C₆H₅)₂, and
- a denotes the value 0, 1 or 2, with the proviso that the sum of the units of the formulae (4) and (5) is at least 0.5% by weight and that at least 15 g of the organopolysiloxanes are soluble in 100 ml of toluene at 20° C.

2. An organopolysiloxane as claimed in claim 1, wherein the units of formula (1) conform to the formula $$-(CH_3)_aSi(O_{(3-a)/2})-(CH_2)_3-N(R^3)-C(O)-(CH_2)_2-C(CN)(CH_3)-N=]_2 \quad (1a)$$

in which
- $R^3$ denotes a hydrogen atom or identical or different monovalent SiC-bonded, optionally substituted $C_1-C_6$-hydrocarbon radicals and a is as defined above.

3. A process for the preparation of an organopolysiloxane as claimed in claim 1, comprising reacting a mixture containing;

(A) organosilanes of the formula $$R_aSi(OR^4)_{3-a}-R^1-X-R^1-Si(OR^4)_{3-a}R_a \quad (8),$$

(B) organosilicon compounds selected from
(B1) organosilanes of the formula $$R^2{}_bSi(OR^4)_{(4-b)} \quad (9)$$

and
(B2) organosiloxanes consisting of units of the formula $$R^2{}_c(OR^4)_dSiO_{(4-c-d)/2}, \quad (10),$$

(C) at least 0.5 mole of water per mole of alkoxy groups in components A and B and,
(D) optionally a water-miscible solvent,
(E) in the presence of ammonia or primary or secondary $C_1-C_4$-alkylamine or of a compound which, with water, liberates ammonia or primary or secondary $C_1-C_4$-alkylamine, where, in the formulae (8) to (10),
- $R^4$ is as defined for $R^2$,
- b, c and d each denote the values 0, 1, 2 or 3, and
- R, $R^1$, $R^2$, X and a are as defined above, with the proviso that component B contains at least 0.01 mole of alkoxy groups per mole of silicon atoms.

4. The process as claimed in claim 3, wherein component E is selected from the group consisting of, $$R^5{}_nSiZ_{4-n} \quad (11),$$

$$(R^5{}_3Si)_2NH \quad (12),$$

$$(R^5{}_2SiNH)_x \quad (13),$$

$$(R^5{}_3Si)_2NR^6 \quad (14)$$

and $$(R^5{}_2SiNR^6)_y \quad (15),$$

where
- $R^5$ denotes a hydrogen atom, a $C_1-C_4$-alkyl radical or the vinyl radical,
- $R^6$ denotes a $C_1-C_4$-alkyl radical,
- Z denotes the group —NHR⁶ or NR⁶₂,
- n denotes the values 2 or 3,
- x denotes integers from 3 to 6, and
- y denotes integers from 1 to 12.

5. A process for the preparation of graft copolymers, in which from 95% to 5% by weight of an organopolysiloxane as claimed in claim 1 is reacted with from 5% to 95% of ethylenically unsaturated monomers.

6. The process as claimed in claim 5, wherein the ethylenically unsaturated monomers are selected from the group consisting of acrylic acid, methacrylic acid, acrylates or methacrylates of aliphatic alcohols and diols having 1 to 10 carbon atoms, acrylonitrile, styrene, p-methylstyrene, vinyl acetate, vinyl propionate, maleimide, vinylpyrrolidone, vinyl chloride, ethylene, butadiene, isoprene and chloroprene.

7. A graft copolymer prepared by the process as claimed in claim 5.

* * * * *